(12) United States Patent
Zeng et al.

(10) Patent No.: US 9,651,995 B2
(45) Date of Patent: May 16, 2017

(54) FOLDABLE ELECTRONIC DEVICE

(71) Applicant: TRONXYZ TECHNOLOGY CO., LTD., Shenzhen (CN)

(72) Inventors: Zhirong Zeng, Shenzhen (CN); Shuibo Tong, Shenzhen (CN); Jinshi Lai, Shenzhen (CN); Qi Ban, Shenzhen (CN); Mingxian Pan, Shenzhen (CN)

(73) Assignee: TRONXYZ TECHNOLOGY CO., LTD., Shenzhen (CN)

( * ) Notice: Subject to any disclaimer, the term of this patent is extended or adjusted under 35 U.S.C. 154(b) by 98 days.

(21) Appl. No.: 14/924,899

(22) Filed: Oct. 28, 2015

(65) Prior Publication Data

US 2016/0187928 A1    Jun. 30, 2016

(30) Foreign Application Priority Data

Dec. 30, 2014 (CN) .......................... 2014 1 0853738
Dec. 30, 2014 (CN) ..................... 2014 2 0859375 U
Dec. 30, 2014 (CN) ..................... 2014 2 0870207 U

(51) Int. Cl.
*G06F 1/16*         (2006.01)

(52) U.S. Cl.
CPC ............ *G06F 1/1641* (2013.01); *G06F 1/166* (2013.01); *G06F 1/1616* (2013.01); *G06F 1/1677* (2013.01)

(58) Field of Classification Search
CPC .... G06F 1/1616; G06F 1/1679; G06F 1/1632; G06F 1/1656; G06F 1/1626; G06F 1/1628; G06F 1/1624; G06F 1/162; G06F 1/1681; G06F 1/163; G06F 2200/1614; G06F 1/1662; G06F 1/1677; G06F 1/166; G06F 1/1669; G06F 1/1641
See application file for complete search history.

(56) References Cited

U.S. PATENT DOCUMENTS 6,256,192 B1 * 7/2001 Shannon ............... G06F 1/1616
                                                    312/223.2
7,136,282 B1 * 11/2006 Rebeske ............... G06F 1/1616
                                                    345/1.1

(Continued)

FOREIGN PATENT DOCUMENTS

CN         2419752 Y     2/2001
CN         1991668 A     7/2007

(Continued)

*Primary Examiner* — Adam B Dravininkas
(74) *Attorney, Agent, or Firm* — Anova Law Group, PLLC

(57) ABSTRACT

The present disclosure provides a foldable electronic device. The foldable electronic device includes a first cover unit, a second cover unit, at least one pivotal connection structure configured to pivotally connect the first cover unit and the second cover unit and, when the foldable electronic device is unlocked, to automatically open the foldable electronic device to an open position, an unlock switch configured to unlock the latch assembly to open the foldable electronic device to the open position from a closed position where the first cover unit and the second cover unit are folded with each other, a closure detector configured to detect a closure status of the foldable electronic device, and a processor having a signal connection with the closure detector and configured to transition between a standby state and an operation state based on the signal received from the closure detector.

15 Claims, 10 Drawing Sheets

(56) References Cited

U.S. PATENT DOCUMENTS

| | | | |
|---|---|---|---|
| 2006/0133019 A1* | 6/2006 | Yamazaki | G06F 1/1616 361/679.21 |
| 2008/0055843 A1* | 3/2008 | Ke | G06F 1/1616 361/679.43 |
| 2008/0070643 A1* | 3/2008 | Park | H04M 1/0216 455/575.3 |
| 2008/0078217 A1* | 4/2008 | Kumagai | G06F 1/1656 70/159 |
| 2010/0081478 A1* | 4/2010 | Itoh | G06F 1/1616 455/566 |
| 2012/0139815 A1* | 6/2012 | Aono | G06F 1/1616 345/1.3 |
| 2013/0088825 A1* | 4/2013 | Mizoguchi | G06F 1/1669 361/679.08 |
| 2013/0250501 A1* | 9/2013 | Guo | H05K 5/0221 361/679.01 |
| 2014/0111916 A1* | 4/2014 | Huang | G06F 1/1654 361/679.01 |
| 2015/0268508 A1* | 9/2015 | Ge | G02F 1/133308 345/633 |

FOREIGN PATENT DOCUMENTS

| | | |
|---|---|---|
| CN | 101086660 A | 12/2007 |
| CN | 103885185 A | 6/2014 |
| CN | 204462935 U | 7/2015 |

\* cited by examiner

FOLDABLE ELECTRONIC DEVICE

CROSS-REFERENCES TO RELATED APPLICATIONS

This application claims the priority of Chinese patent applications No. CN201410853738.2, filed on Dec. 30, 2014, CN201420870207.X, filed on Dec. 30, 2014, and CN201420859375.9, filed on Dec. 30, 2014, the entire contents of all of which are incorporated herein by reference.

FIELD OF THE DISCLOSURE

The present disclosure generally relates to the field of electronic device technologies and, more particularly, relates to a foldable electronic device.

BACKGROUND

When using a conventional electronic device, such as a laptop computer, the laptop computer user may have to go through the following steps. The user manually opens the cover of the laptop computer to expose the power button and then pushes the power button to power up the laptop computer. The laptop computer enters into an operation mode. When the user no longer wants to use the laptop computer, the user generally folds the cover to the base to turn the laptop computer into a standby mode to save power. When the user again wants to use the laptop computer, the user opens the cover and then pushes the power button to return the laptop computer to the operation mode from the standby mode.

In other words, the conventional technology often requires multiple steps to operate the electronic devices. The user has to manually open the cover. After the cover is opened, the user has to manually turn on the power. Similarly, when the user opens the cover of the electronic device in the standby mode, the user has to push the power button to switch on the electronic device from the standby mode to the operation mode. From user experience point of view, such operations impact user experience and are less desirable.

The disclosed foldable electronic device is directed to solve one or more problems set forth above and other problems in the art.

BRIEF SUMMARY OF THE DISCLOSURE

Directed to solve one or more problems set forth above and other problems in the art, the present disclosure provides a foldable electronic device to improve the user experience.

One aspect of the present disclosure provides a foldable electronic device. The foldable electronic device includes a first cover unit, a second cover unit, at least one pivotal connection structure configured to pivotally connect the first cover unit and the second cover unit and, when the foldable electronic device is unlocked, to automatically open the foldable electronic device to an open position where the first cover unit and the second cover unit are unfolded from each other, an unlock switch configured to unlock the latch assembly to open the foldable electronic device to the open position from a closed position where the first cover unit and the second cover unit are folded with each other, a closure detector configured to detect a closure status of the foldable electronic device, and a processor having a signal connection with the closure detector and configured to transition between a standby state and an operation state based on the signal received from the closure detector. When the unlock switch is activated, the foldable electronic device opens from the closed position to the open position and transitions from the standby state to the operation state. When the foldable electronic device closes to the closed position, the foldable electronic device is triggered to transition from the operation state to the standby state.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

Figure 1:
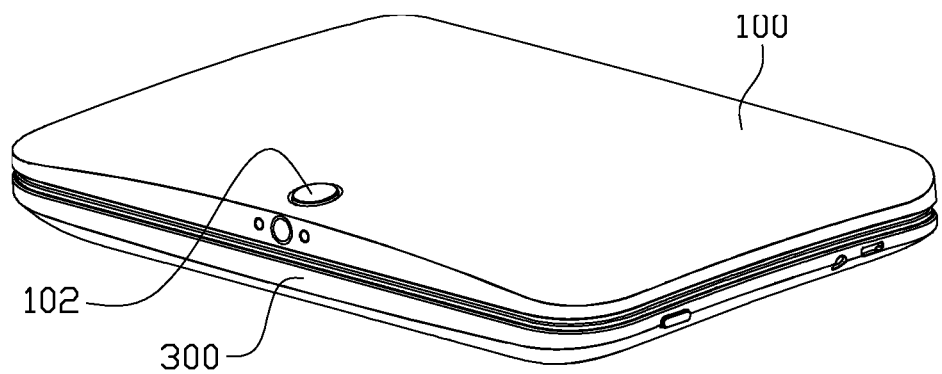
FIG. 1 illustrates a schematic view of an exemplary foldable electronic device in a closed position according to the disclosed embodiments.
Figure 2:
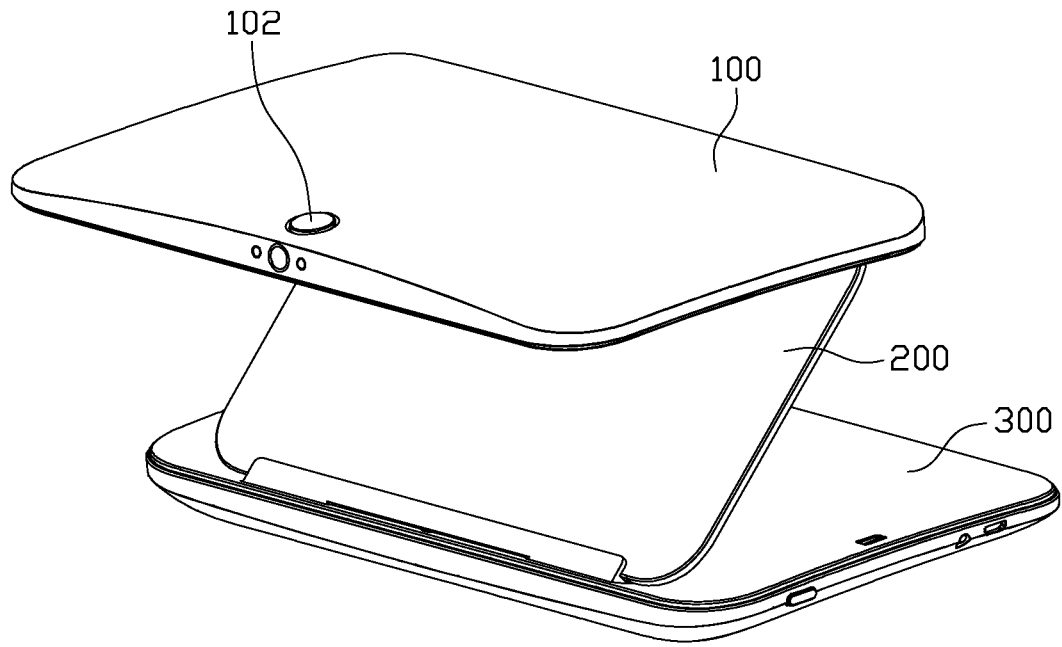
FIG. 2 illustrates a schematic view of an exemplary foldable electronic device in an open position according to the disclosed embodiments.

FIG. 1 illustrates a schematic view of an exemplary foldable electronic device in a closed position according to the present disclosure. FIG. 2 illustrates a schematic view of the exemplary foldable electronic device in an open position according to the present disclosure.

Referring to FIGS. 1-2, the foldable electronic device includes a first cover unit 100, a transflective unit 200, and a second cover unit 300. In one embodiment, the first cover unit 100 may be an upper cover assembly of the foldable electronic device, and the second cover unit 300 may be a lower cover assembly of the foldable electronic device. In other embodiments, the first cover unit 100 may be a lower cover assembly of the foldable electronic device, and the second cover unit 300 may be an upper cover assembly of the foldable electronic device.

As shown in FIGS. 1-2, the foldable electronic device may have two positions: a closed position as shown in FIG. 1 and an open position as shown in FIG. 2. When the foldable electronic device is in the closed position, the foldable electronic device may be in a flat box shape. When the foldable electronic device is in the open position, the foldable electronic device may have the first cover unit 100, the transflective unit 200 and the second cover unit 300 arranged in a Z shape or other suitable shapes.

Figure 3:
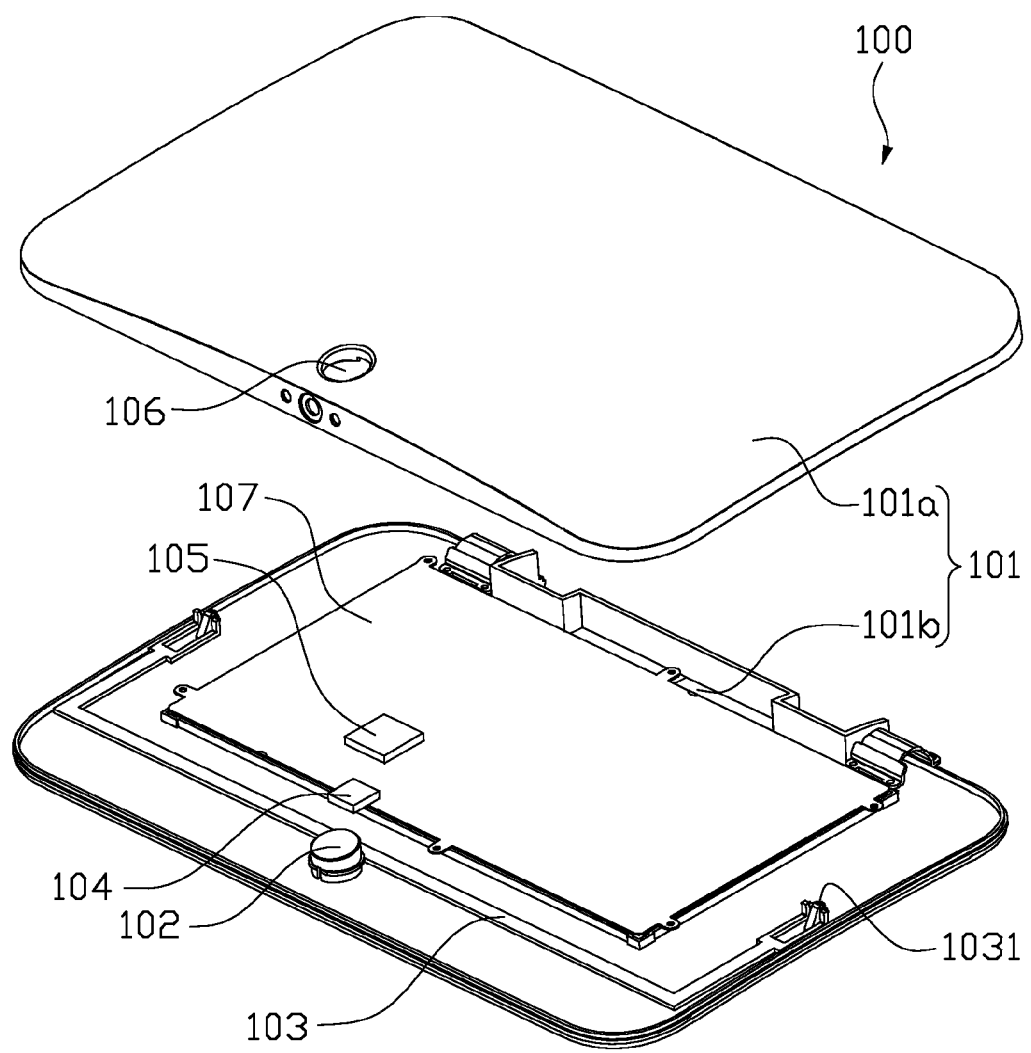
FIG. 3 illustrates a schematic view of a first cover unit of the exemplary foldable electronic device according to the disclosed embodiments.

FIG. 3 illustrates a schematic view of the first cover unit 100 of the exemplary foldable electronic device according to the present disclosure. Referring to FIG. 3, the first cover unit 100 includes a first enclosure 101, an unlock switch 102, and a latch assembly 103. The unlock switch 102 and the latch assembly 103 are disposed inside the first enclosure 101. The unlock switch 102 is configured to unlock the latch assembly 103.

In one embodiment, the unlock switch 102 may be a button switch. The button switch may be disposed on the first enclosure 101. When pressed, the button switch may push and unlock the latch assembly 103.

In one embodiment, the first enclosure 101 may include a top cover 101a and a bottom cover 101b. The unlock switch 102 and the latch assembly 103 may be disposed on the bottom cover 101b. The top cover 101a may close onto the bottom cover 101b. The top cover 101a and the bottom cover 101b may be combined to form the first enclosure 101. The top cover 101a may have an opening 106 corresponding to the location of the unlock switch 102 to expose the unlock switch 102. A user may press the unlock switch 102 to open the foldable electronic device.

Figure 4:
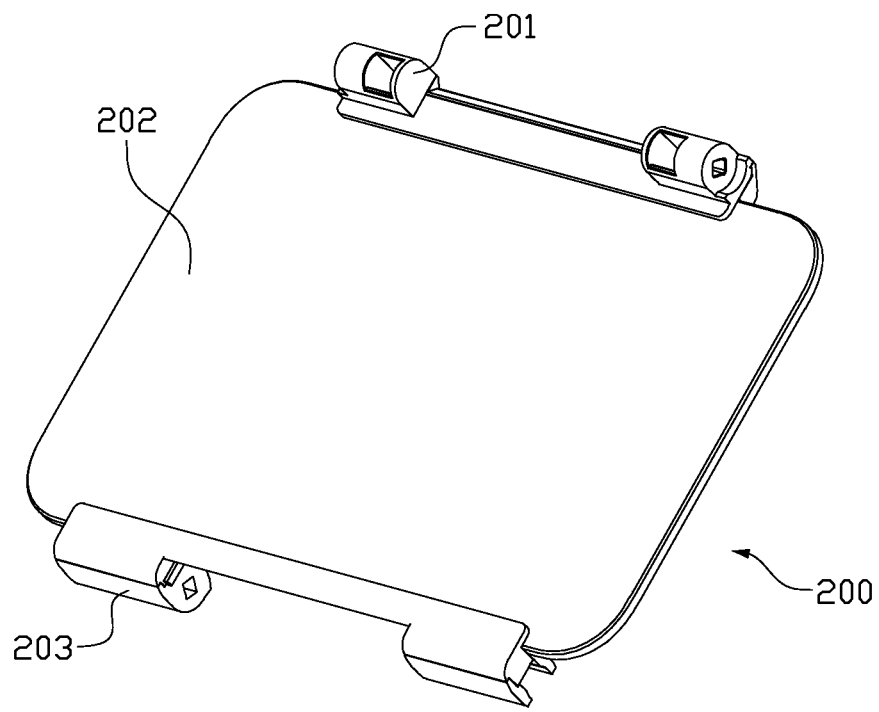
FIG. 4 illustrates a schematic view of a transflective unit of the exemplary foldable electronic device according to the disclosed embodiments.

FIG. 4 illustrates a schematic view of the transflective unit of the exemplary foldable electronic device according to the present disclosure. Referring to FIG. 4, the transflective unit 200 includes a first torsion spring shaft 201, a transflective plate 202, and a second torsion spring shaft 203. The first torsion spring shaft 201 and the second torsion spring shaft 203 are disposed on the upper and lower sides of the transflective plate 202 respectively. The first torsion spring shaft 201 is configured to connect to the first cover unit 100 and the second torsion spring shaft 203 is configured to connect to the second cover unit 300.

The first and the second torsion spring shafts 201/203 are configured with torsion springs (not shown) to provide torque to automatically open the first cover unit 100 and the transflective unit 200 when the foldable electronic device is unlocked. In other words, the transflective unit 200 is pivotally connected to the first cover unit 100 and the second cover unit 300 through a pivotal connection structure, e.g., the first and the second torsion spring shafts. Both the first cover unit 100 and the second cover unit 300 can automatically open based on the pivotal connection structure under the torque provided by the torsion springs in the first and the second torsion spring shafts.

When the unlock switch 102 is pressed, the latch assembly 103 is unlocked. Driven by the pivotal connection structure, the foldable electronic device automatically opens from the closed position to the open position. Alternatively, other than the first torsion spring shaft 201 and the second torsion spring shaft 203, the pivotal connection structure may include other suitable mechanisms to achieve the automatic opening.

Figure 5:
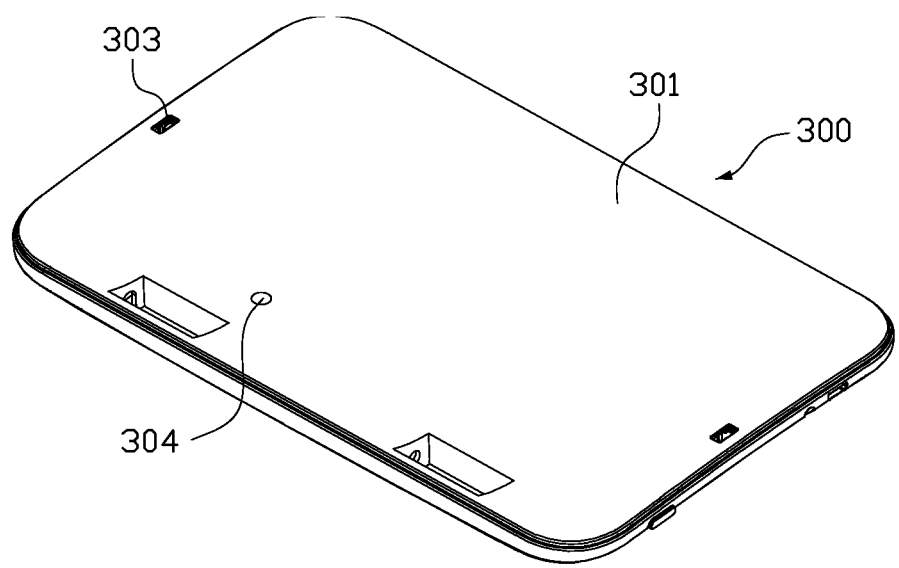
FIG. 5 illustrates a schematic view of a second cover unit of the exemplary foldable electronic device according to the disclosed embodiments.

FIG. 5 illustrates a schematic view of the second cover unit of the exemplary foldable electronic device according to the present disclosure. Referring to FIG. 5, the second cover unit 300 includes a second enclosure 301 and a bolt 303. The bolt 303 is disposed inside the second enclosure 301. Fastened to the second enclosure 301, the bolt 303 is coupled with the latch assembly 103 to form a locking structure. Preferably, two bolts 303 are configured on both sides of the second enclosure 301 to securely lock both sides of the foldable electronic device.

In one embodiment, the first cover unit 100, the transflective unit 200, and the second cover unit 300 may be assembled together in the following manner. The first cover unit 100 and the second cover unit 300 may be connected through the transflective unit 200. The first cover unit 100 may be connected to the transflective unit 200 through the first torsion spring shaft 201. The second cover unit 300 may be connected to the transflective unit 200 through the second torsion spring shaft 203. As shown in FIG. 2, the foldable electronic device is in an open position. The first cover unit 100 is parallel to the second cover unit 300. The transflective unit 200 is tilted at a 45° angle. The transflective unit 200 forms a 45° angle with reference to the first cover unit 100 and the second cover unit 300.

Figure 6:
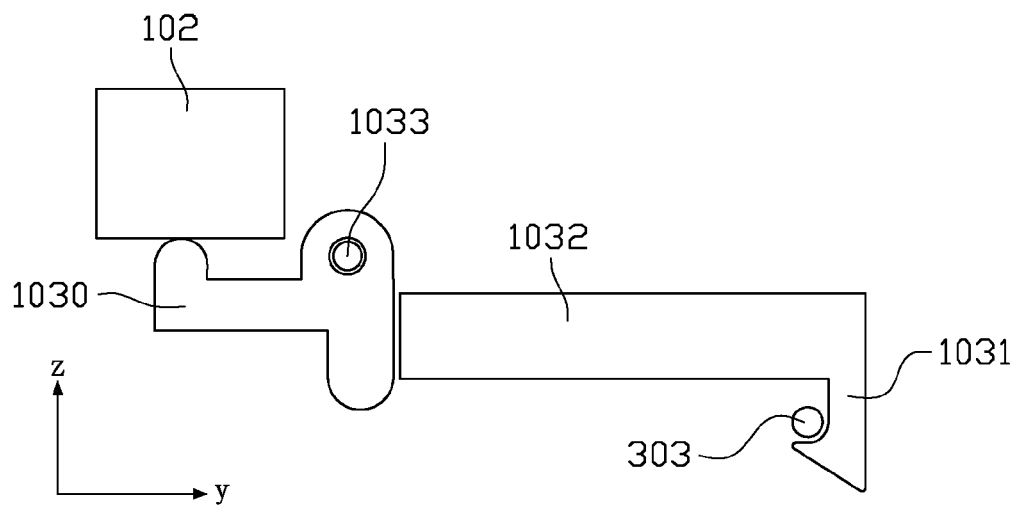
FIG. 6 illustrates a schematic view of a latch assembly of the exemplary foldable electronic device in a locked position according to the disclosed embodiments.
Figure 7:
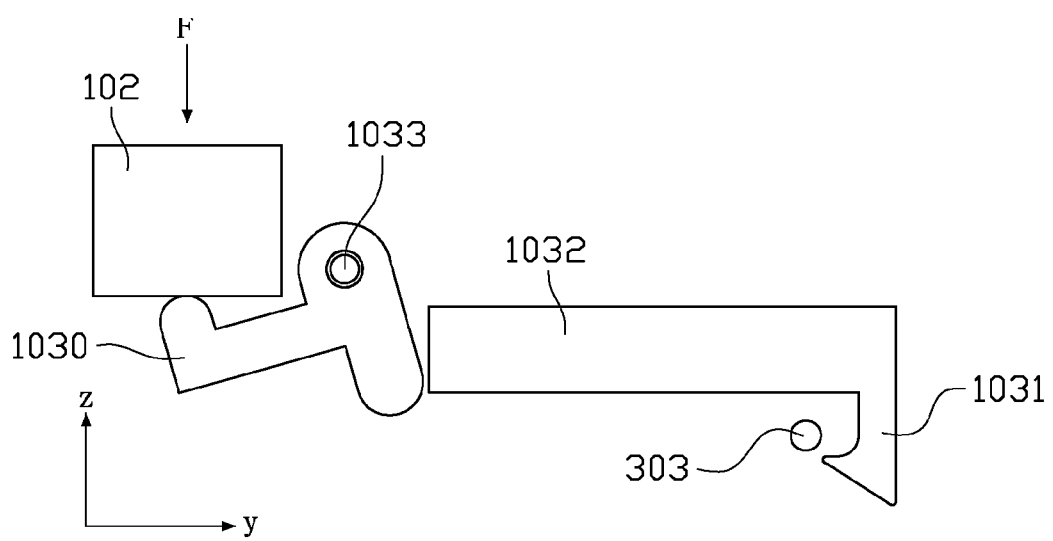
FIG. 7 illustrates a schematic view of the latch assembly of the exemplary foldable electronic device in an unlocked position according to the disclosed embodiments.

FIG. 6 illustrates a schematic view of a latch assembly of the exemplary foldable electronic device in a locked position according to the present disclosure. FIG. 7 illustrates a schematic view of the latch assembly of the exemplary foldable electronic device in an unlocked position according to the present disclosure. The operation principle of automatically opening the foldable electronic device with the push of a button is described with the accompanying FIGS. 6-7.

As shown in FIGS. 6-7, the latch assembly 103 includes a pressing lever 1030, a pressing lever shaft 1033, an unlocking rod 1032, and a hook 1031. The unlock switch 102 contacts and engages with pressing lever 1030. The pressing lever shaft 1033 is secured to a fixed position. The pressing lever 1030 is mounted on the pressing lever shaft 1033 and is able to rotate around the pressing lever shaft 1033. The pressing lever 1030 contacts and engages with the unlocking rod 1032. The unlocking rod 1032 includes the hook 1031 on the end away from pressing lever 1030. The hook 1031 is configured to latch onto the bolt 303 to place the latch assembly 103 in a locked position.

The unlocking rod 1032 only moves in the direction of y axis due to the constraint of the first cover unit 100. Similarly, the unlock switch 102 only moves in the direction of z axis due to the constraint of the first cover unit 100. When a user presses down the unlock switch 102, the unlock switch moves downward along the z axis causing the pressing lever 1030 to rotate around the pressing lever shaft 1033. At the same time, the rotating pressing lever 1030 pushes the unlocking rod 1032 and the hook 1031 to move horizontally in the direction of y axis, and the hook 1031 disengages from the bolt 303. As shown in FIG. 7, the first cover unit 100 unlocks from the second cover unit 300.

When the first cover unit 100 unlocks from the second cover unit 300, the second torsion spring shaft 203 connected to the second cover unit 300 begins to rotate and drives the transflective unit 200 to open upward and turn until the transflective unit 200 is tilted at an acute angle, for example, a 45° angle with reference to the second cover unit 300. At the same time, the first torsion spring shaft 201 connected to the first cover unit 100 also rotates and drives the transflective unit 200 to open and turn until the transflective unit 200 is tilted at an acute angle, for example, a 45° angle with reference to the first cover unit 100. Thus, the foldable electronic device automatically opens from the original closed position.

In one embodiment, when the latch assembly 103 engages and locks to the bolts 303, the foldable electronic device may be placed in a closed position like a flat box (as shown in FIG. 1). When the unlock switch 102 is pushed, the latch assembly 103 may disengage and unlock from the bolts 303. Driven by the first and the second torsion spring shafts 201/203, the foldable electronic device may automatically open to an open position (as shown in FIG. 2). Thus, the operation of opening the foldable electronic device may be simplified to the push of a single button. After the unlock switch 102 is pushed, the subsequent operation may be automatic and may require no further manual intervention. The simplified user operation may improve user experience.

Further, the foldable electronic device has a standby state and an operation state that are described in the followings.

Referring to FIG. 3, the foldable electronic device may further include a closure detector and a processor 105. The closure detector may be electrically connected to the processor 105. In one embodiment, the closure detector may include a magnetic sensor 104 and a magnet 304 (in FIG. 5). Either the magnetic sensor 104 or the magnet 304 may be disposed in the first cover unit 100. The other may be disposed in the second cover unit 300. For example, the magnetic sensor 104 may be disposed in the first cover unit 100 (in FIG. 3) and the magnet 304 may be disposed in the second cover 300 (in FIG. 5). Further, the magnet 304 and the magnetic sensor 104 may be placed facing toward each other.

When the magnetic sensor 104 detects the presence of the magnet 304, the magnetic sensor 104 may produce a sensor signal. The magnetic sensor 104 may be electrically connected to the processor 105, which may be disposed on either the first cover unit 100 (in FIG. 3) or the second cover unit 300. The magnetic sensor 104 may send the sensor signal to the processor 105. The processor 105 may receive the sensor signal from the magnetic sensor 104 to indicate the presence of the magnet 304. The magnetic sensor 104, the magnet 304, and the processor 105 may be coordinated to determine and control various states of the foldable electronic device such as the standby state and the operation state.

When the foldable electronic device is placed in a closed position, the magnetic sensor 104 may be close to the magnet 304 and may detect a substantial magnetic field. The closure detector may detect that the foldable electronic device is placed in a closed position. The magnetic sensor 104 may encode the current state into a first sensor signal and may send the first sensor signal to the processor 105. When the processor 105 receives the first sensor signal, the processor 105 may determine that the foldable electronic device is placed in a closed position and may transition the foldable electronic device into the standby state.

When the foldable electronic device opens, the first cover unit 100 may move away from the second cover unit 300. As the magnetic sensor 104 moves away from the magnet 304, the magnetic sensor 104 may be unable to detect any substantial magnetic field. The closure detector may detect that the foldable electronic device is not placed in a closed position. The magnetic sensor 104 may encode the current state into a second sensor signal and may send the second sensor signal to the processor 105. When the processor 105 receives the second sensor signal, the processor 105 may determine that the foldable electronic device is placed in an open position and may transition the foldable electronic device into the operation state from the standby state.

When the foldable electronic device is placed in a closed position, the foldable electronic device may also transition into the standby state at the same time. When the user wants to open the foldable electronic device, the user may only push the unlock switch 102. Subsequently, the foldable electronic device may automatically open. When the foldable electronic device opens, the magnetic sensor 104, the processor 105, and the magnet 304 may work together to transition the foldable electronic device from the standby state to the operation state. The user is not required to perform any additional key operation. The simplified user operation may improve the user experience.

In certain embodiments, the foldable electronic device may be a foldable display device that receives external image data through wired or wireless communication method and displays images. The foldable electronic device may also include a display screen 107. The display screen 107 may be disposed on the first cover unit 100 or the second cover unit 300.

In one embodiment, the display screen 107 may be disposed on the first cover unit 100. The display screen 107 may be configured to receive external image data and display images. Moreover, when the foldable electronic device is placed in an open position, the transflective plate 202 and the display screen 107 form an acute angle, for example, a 45° angle. The transflective unit 200 may transflect the images displayed on the display screen 107 into the space between the first cover unit 100 and the second cover unit 300. The user may view the images that are transflected into that space. The transflective unit 200 may be transparent. The transparent transflective unit 200 may reflect the images displayed on the display screen 107 of the first cover unit 100 and may transmit the real life scene behind the transflective unit 200. The user may be able to view a virtual image display that overlaps the screen images over the real life scene background.

Figure 8:
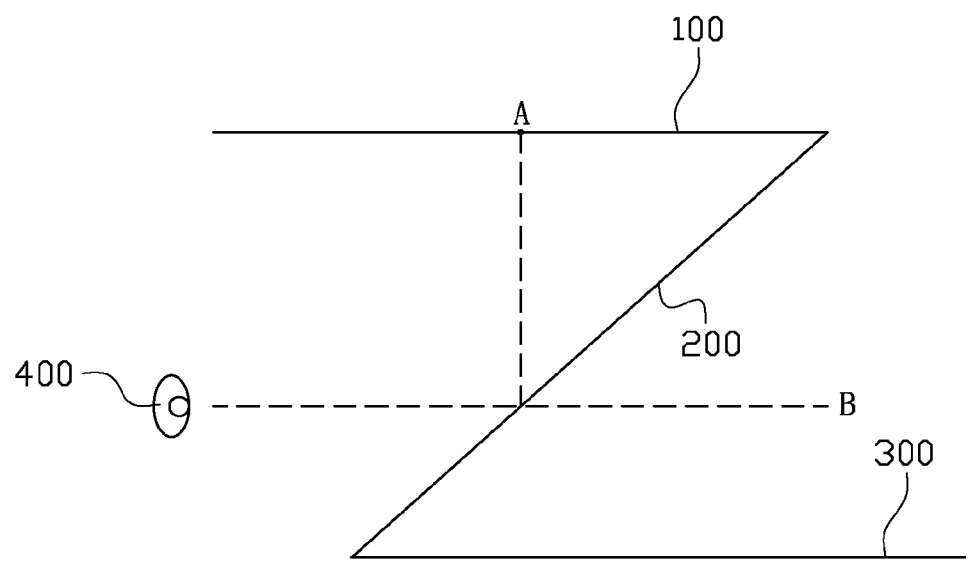
FIG. 8 illustrates a schematic view of the image display operation principle of the exemplary foldable electronic device according to the disclosed embodiments.

FIG. 8 illustrates a schematic view of the image display operation principle of the exemplary foldable electronic device according to the present disclosure. The foldable display device is in the open position, and the first cover unit, the transflective unit, and the first cover unit are placed in a Z shaped position, with the first cover unit and the second cover unit parallel with each other, and the transflective plate and the display screen forming an acute angle. Referring to FIG. 8, the first cover unit 100 has a point A in the image displayed on the display screen 107. The point A is reflected by the transflective unit 200 and is seen by the eye 400 of the viewer. Because the transflective unit 200 is tilted at an acute angle (for example, a 45° angle) with reference to the display screen 107, the viewer is able to see the image of point A at the point B behind the transflective unit 200. Further, due to the transparency of the transflective unit 200, the viewer is able to see the real life scene behind the transflective unit 200. Thus, the display effect that combines the view image and real life scene is achieved.

Figure 9:
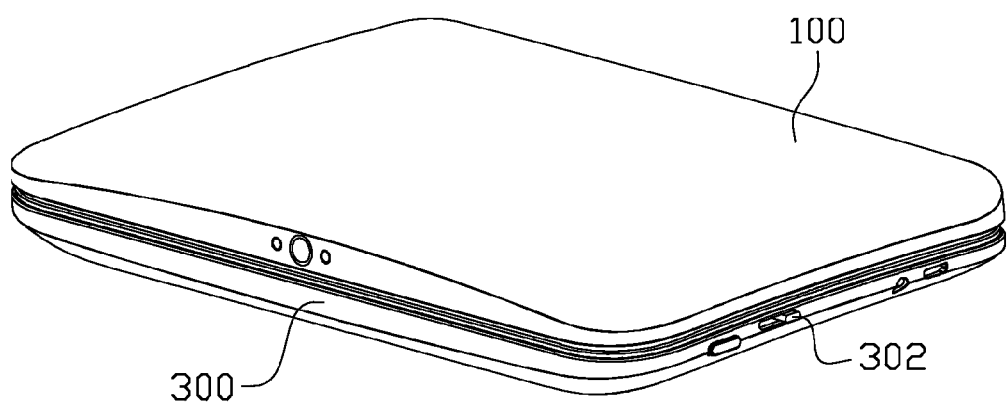
FIG. 9 illustrates a schematic view of another exemplary foldable electronic device in a closed position according to the disclosed embodiments.

FIG. 9 illustrates a schematic view of another exemplary foldable electronic device in a closed position according the present disclosure. Referring to FIG. 9, the difference in this exemplary foldable electronic device may include the unlocking structure and unlocking method. Specifically, a sliding unlock switch 302 may be disposed on the second cover unit 300 instead of the first cover unit 100. The sliding unlock switch 302 may be a sliding switch. Further, the sliding unlock switch 302 may be disposed on the side the second cover unit 300 and adjacent to the bolt 303. The unlock switch 302 may be connected to the bolt 303. When the sliding unlock switch 302 slides, the bolts 303 may move with the sliding unlock switch 302.

Figure 10:
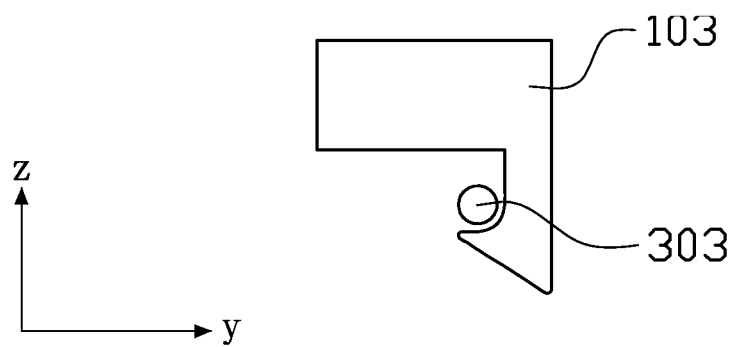
FIG. 10 illustrates a schematic view of a latch assembly of another exemplary foldable electronic device in a locked position according to the disclosed embodiments.
Figure 11:
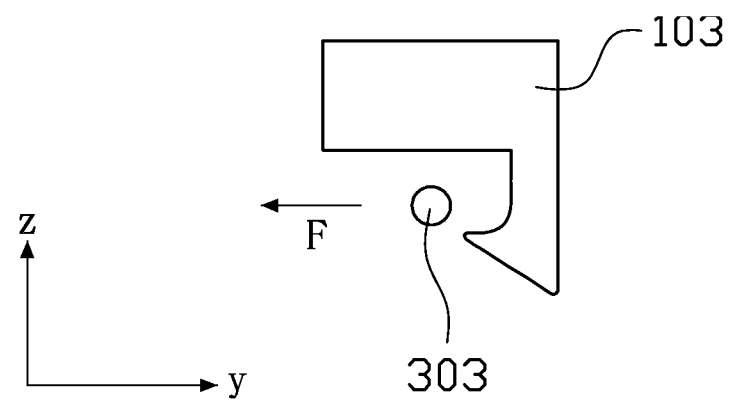
FIG. 11 illustrates a schematic view of the latch assembly of the another exemplary foldable electronic device in an unlocked position according to the disclosed embodiments.

FIG. 10 illustrates a schematic view of a latch assembly of another exemplary foldable electronic device in a locked position according to the present disclosure. FIG. 11 illustrates a schematic view of the latch assembly of another exemplary foldable electronic device in an unlocked position according to the present disclosure.

Referring to FIGS. 10-11, in one embodiment, the latch assembly 103 may be fastened to the first cover unit 100. The latch assembly 103 may be simpler than those in the previous embodiments. For example, the latch assembly 103 may only include the hook. To open the foldable electronic device, the user may only need to slide the sliding unlock switch 302. The sliding unlock switch 302 may move the bolt 303 toward the left to unlock the foldable electronic device. Then the foldable electronic device may automatically open to an open position. When the user releases the sliding unlock switch 302, the sliding unlock switch 302 and the bolt 303 may be automatically pulled back to the initial reset position. The other aspects of this exemplary foldable electronic device may be similar to the previous embodiments.

Figure 12:
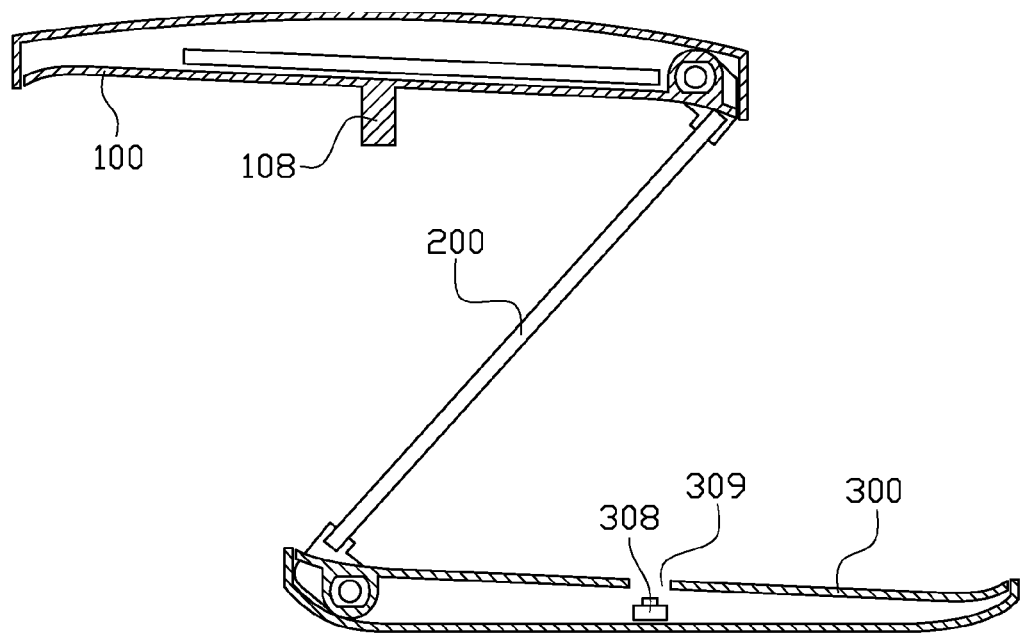
FIG. 12 illustrates a cross-sectional view of another exemplary foldable electronic device in an open position according to the disclosed embodiments.
Figure 13:
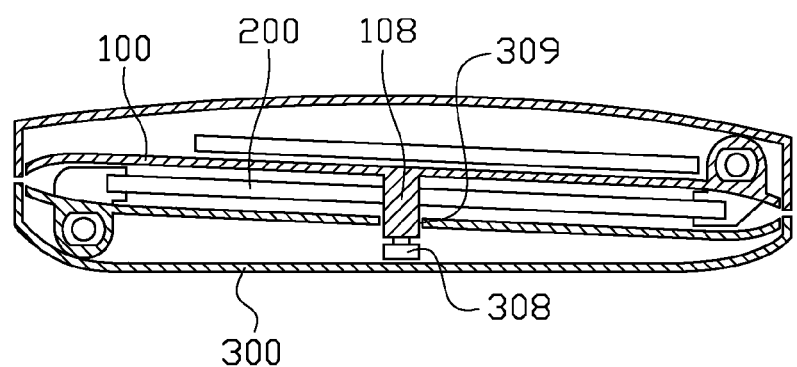
FIG. 13 illustrates a cross-sectional view of another exemplary foldable electronic device in a closed position according to the disclosed embodiments.

FIG. 12 illustrates a schematic view of another exemplary foldable electronic device in an open position according to the present disclosure. FIG. 13 illustrates a schematic view of another exemplary foldable electronic device in a closed position according to the present disclosure.

Referring to FIGS. 12-13, the difference in this exemplary foldable electronic device may include the transition method between the standby state and the operation state. Specifically, the closure detector may include a contact lever 108 and a push button 308. Either the contact lever 108 or the push button 308 may be disposed on the first cover unit 100, and the other may be disposed on the second cover unit 300.

For example, in one embodiment, the contact lever 108 may be disposed on the first cover unit 100 and the push button 308 may be disposed on the second cover unit 300. Specifically, the contact lever 108 may protrude from the first cover unit 100 toward the second cover unit 300. The push button 308 may be disposed inside the second cover unit 300.

The second cover unit 300 may have an opening 309 to expose the push button 308. The opening 309 may allow the contact lever 108 to pass through and press onto the push button 308. Preferably, the contact lever 108 and the push button 308 may be disposed adjacent to the side edges of the first cover unit 100 and the second cover unit 300. When the foldable electronic device closes, the contact lever 108 may pass through from the side of the transflective unit 200 without obstruction. Thus, the contact level 108 may not affect the transflective unit 200.

The foldable electronic device may further include the processor 105. The processor 105 may have a signal connection with the push button 308. When the contact lever 108 pushes down the push button 308, the push button 308 may be triggered to send a signal to the processor 105. The processor 105 receives the signal to detect the closure status. The processor may be disposed on either the first cover unit 100 or the second cover unit 300.

As shown in FIG. 13, when the foldable electronic device closes, the contact lever 108 may press down the push button 308 and may trigger the push button 308 to send the signal to the processor 105. The processor 105 may receive the signal to detect that the foldable electronic device is placed in a closed position. The processor 105 may transition the foldable electronic device from the operation state to the standby state.

As shown in FIG. 12, when the foldable electronic device opens, the contact lever 108 may disengage from the push button 308 and may trigger the push button 308 to send the signal to the processor 105. The processor 105 may receive the signal to detect that the foldable electronic device is placed in an open position. The processor 105 may transition the foldable electronic device from the standby state to the operation state.

Thus, the triggering of the push button 308 status change may provide the decision making condition for the processor 105 to decide the automatic switching between the standby state and the operation state of the foldable electronic device. When the foldable electronic device closes, the contact lever 108 may push down the push button 308 and trigger the push button 308 to send the signal to the processor 105. The processor 105may detect that the foldable electronic device is placed in a closed position and the foldable electronic device may automatically transition to the standby state.

When the foldable electronic device opens, the contact lever 108 may release and disengage the push button 308 and trigger the push button 308 to send the signal to the processor 105. The processor 105may detect the foldable electronic device is placed in an open position and the foldable electronic device may automatically transition to the operation state. Thus, the automatic switching between the standby state and the operation state of the foldable electronic device is achieved. The other aspects of this exemplary foldable electronic device may be similar to the previous embodiments.

Figure 14:
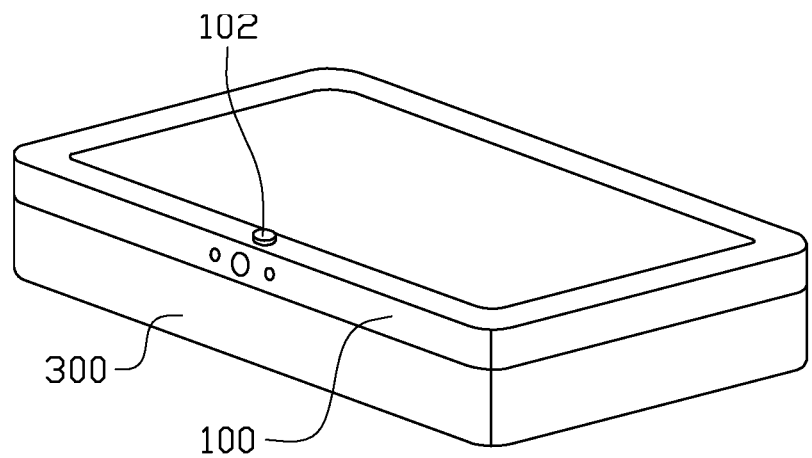
FIG. 14 illustrates a schematic view of another exemplary foldable electronic device in a closed position according to the disclosed embodiments.
Figure 15:
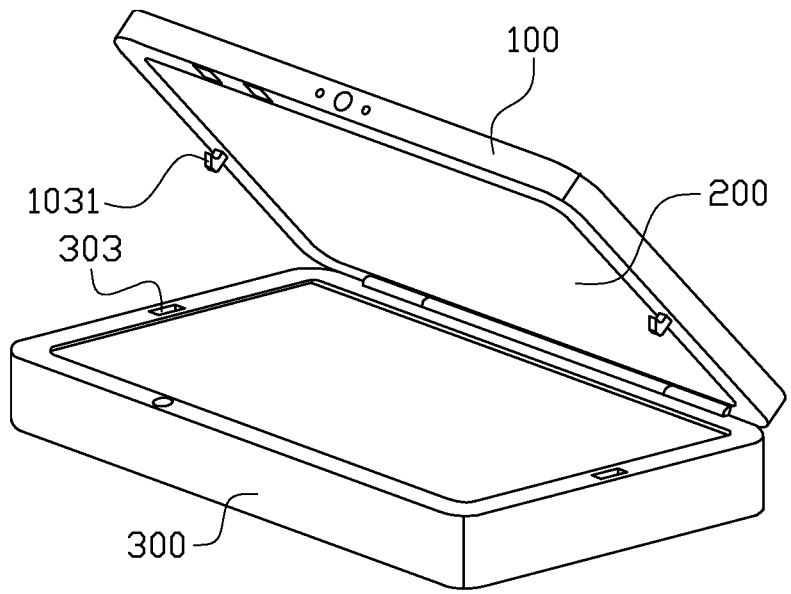
FIG. 15 illustrates a schematic view of another exemplary foldable electronic device in an open position according to the disclosed embodiments.

FIG. 14 illustrates a schematic view of another exemplary foldable electronic device in a closed position according to the present disclosure. FIG. 15 illustrates a schematic view of another exemplary foldable electronic device in an open position according to the present disclosure.

Referring to FIGS. 14-15, the difference of this exemplary foldable electronic device may include that the transflective unit 200 is integrated into the first cover unit 100. Specifically, in one embodiment, the transflective unit 200 may be disposed on the first cover unit 100. The first cover unit 100 may be pivotally connected to the second cover unit 300 through a pivotal connection structure (for example, torsion spring shaft). The transflective unit 200 may include a transflective plate 202.

When the unlock switch 102 is actuated, the latch assembly 103 may disengage the hook 1031 and the bolt 303 to unlock the foldable electronic device. Driven by the pivotal connection structure, the foldable electronic device may automatically open to an open position. The first cover unit 100 may open relative to the second cover unit 300. The foldable display device, i.e., the first cover unit 100 and the second cover unit 300 are placed in a "∠" shaped position, where the transflective plate and the display screen form an acute angle. Moreover, the foldable electronic device may use the closure detector to achieve the automatic switching between the standby state and the operation state. The closure detector may include the magnetic sensor 104 and magnet 304 as described in the previous embodiments.

When the magnetic senor 104 detects that the foldable electronic device is placed in a closed position, the processor 105 may receive the signal from the connected magnetic sensor 104 to transition the foldable electronic device into the standby state. When the magnetic senor 104 detects that the foldable electronic device is placed in an open position, the processor 105 may receive the signal from the connected magnetic sensor 104 to transition the foldable electronic device into the operation state.

In another embodiment, the foldable electronic device may be a foldable display device. The second cover unit 300 may include a display screen 107, configured to display the image data received externally. When the foldable display device is placed in an open position, the foldable display device may be placed in a "∠" shaped position, where the transflective plate 202 and the display screen 107 form an acute angle, for example, a 45° angle. The transflective unit 200 may reflect the images displayed on the display screen 107 into the space above the second cover unit 300 for the user to view. The other aspects of this exemplary foldable electronic device may be similar to the previous embodiments.

Figure 16:
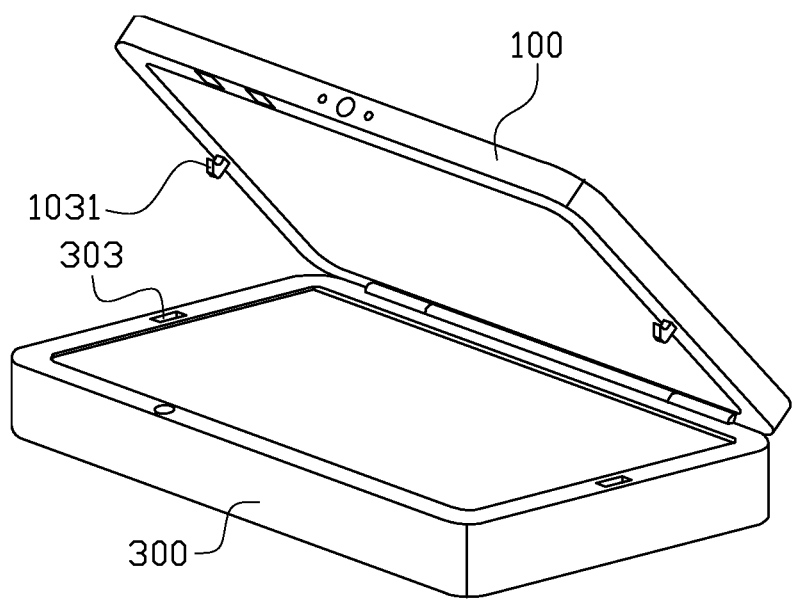
FIG. 16 illustrates a schematic view of another exemplary foldable electronic device in an open position according to the disclosed embodiments.

FIG. 16 illustrates a schematic view of another exemplary foldable electronic device in an open position according to the present disclosure. Referring to FIG. 16, the difference of this exemplary foldable electronic device may include that the foldable electronic device does not include the transflective unit 200. Specifically, in one embodiment, the foldable electronic device may be an ordinary electronic device such as a laptop computer, etc. The first cover unit 100 may be pivotally connected to the second cover unit 300 through a pivotal connection structure (for example, a torsion spring shaft).

Driven by the pivotal connection structure, the foldable electronic device may automatically open to an open position. The first cover unit 100 may open relative to the second cover unit 300. Moreover, the foldable electronic device may use the closure detector to achieve the automatic switching between the standby state and the operation state. The closure detector may include the magnetic sensor 104 and magnet 304 as described in the previous embodiments.

When the magnetic senor 104 detects that the foldable electronic device is placed in a closed position, the processor 105 may receive the signal from the connected magnetic sensor 104 to transition the foldable electronic device into the standby state. When the magnetic senor 104 detects that the foldable electronic device is placed in an open position, the processor 105 may receive the signal from the connected magnetic sensor 104 to transition the foldable electronic device into the operation state. The other aspects of this exemplary foldable electronic device may be similar to the previous embodiments.

Figure 17:
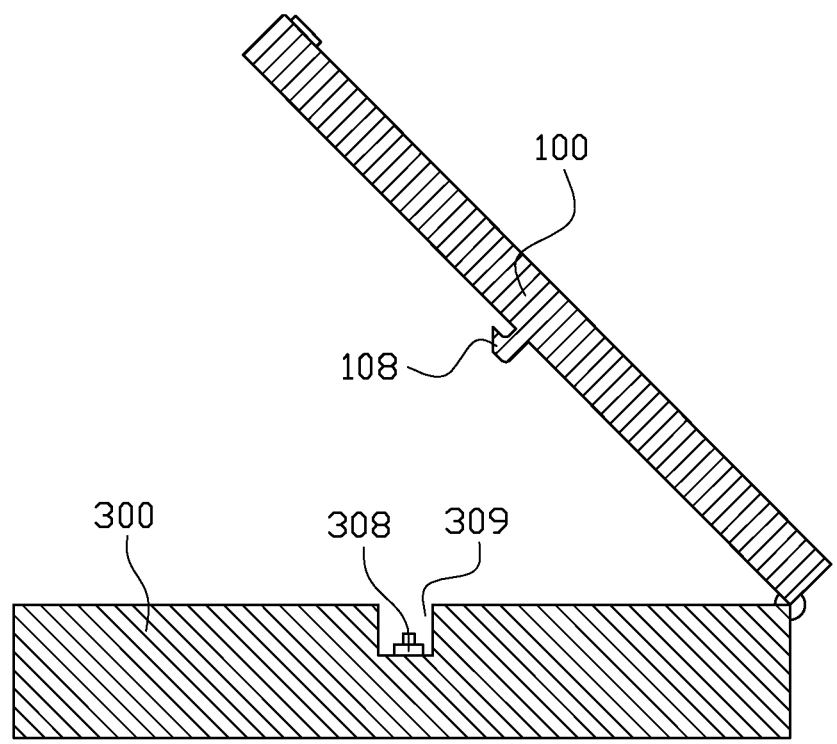
FIG. 17 illustrates a cross-sectional view of another exemplary foldable electronic device in an open position according to the disclosed embodiments.
Figure 18:
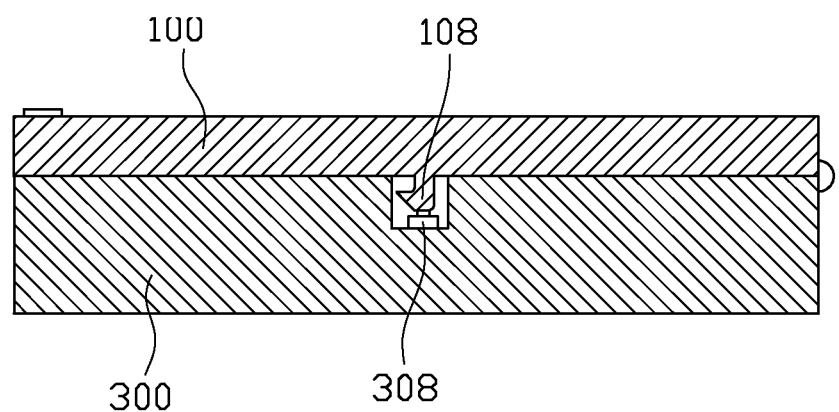
FIG. 18 illustrates a cross-sectional view of another exemplary foldable electronic device in a closed position according to the disclosed embodiments.

FIG. 17 illustrates a schematic view of another exemplary foldable electronic device in an open position according to the present disclosure. FIG. 18 illustrates a schematic view of another exemplary foldable electronic device in a closed position according to the present disclosure. Referring to FIGS. 17-18, the difference of this exemplary foldable electronic device may include that the foldable electronic device does not include a transflective unit 200 and the closure detector includes the contact lever 108 and the push button 308 instead of the magnetic sensor 104 and the magnet 304.

Specifically, in one embodiment, the foldable electronic device may use the closure detector to achieve the automatic switching between the standby state and the operation state. The other aspects of this exemplary foldable electronic device may be similar to the previous embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A foldable electronic device, comprising:
   a first cover unit;
   a second cover unit;
   at least one pivotal connection structure configured to pivotally connect the first cover unit and the second cover unit and, when the foldable electronic device is unlocked, to automatically open the foldable electronic device to an open position where the first cover unit and the second cover unit are unfolded from each other;
   an unlock switch configured to unlock the latch assembly to open the foldable electronic device to the open position from a closed position where the first cover unit and the second cover unit are folded with each other;
   a closure detector configured to detect a closure status of the foldable electronic device; and
   a processor having a signal connection with the closure detector and configured to transition between a standby state and an operation state based on the signal received from the closure detector, wherein:
   when the unlock switch is activated, the foldable electronic device opens from the closed position to the open position and transitions from the standby state to the operation state; and
   when the foldable electronic device closes to the closed position, the foldable electronic device is triggered to transition from the operation state to the standby state.

2. The foldable electronic device of claim 1, wherein:
   the first cover unit includes a latch assembly; and
   the second over unit includes a bolt, the bolt being coupled with the latch assembly to lock and unlock the foldable electronic device.

3. The foldable electronic device of claim 2, wherein:
   the unlock switch is a push button disposed on the first cover unit; and
   when the unlock switch is pushed down, the unlock switch unlocks the latch assembly from the bolt.

4. The foldable electronic device of claim 3, wherein the latch assembly includes:

a pressing lever capable of being engaged and pressed by the unlock switch;
a pressing lever shaft capable of being secured to a fixed position;
an unlocking rod capable of being engaged and pushed by the pressing lever; and
a hook formed on an end of the unlocking rod away from the pressing lever, wherein, when the unlock switch is pushed down, the pressing lever rotates around the pressing lever shaft; the rotating pressing lever pushes the unlocking rod; and the unlocking rod unlocks the hook from the bolt.

5. The foldable electronic device of claim 2, wherein,
the unlock switch is a sliding unlock switch disposed on the second cover unit; and
the sliding unlock switch drags the bolt to unlock the latch assembly.

6. The foldable electronic device of claim 2, wherein:
the closure detector includes a magnetic sensor and a magnet separately disposed on the first cover unit and the second cover unit;
the magnetic sensor and the magnet are adjacent to each other when the foldable electronic device closes with the first cover unit and the second cover unit being folded together; and
the magnetic sensor senses presence status of the magnet and sends an encoded signal to the processor when a change on the presence status is detected.

7. The foldable electronic device of claim 6, wherein:
when the foldable electronic device closes, the magnetic sensor senses the presence of the magnet and sends a first signal to the processor and, when the processor receives the first signal from the magnetic sensor, the processor transitions the foldable electronic device into the standby state; and
when the foldable electronic device opens, the magnetic sensor senses the absence of the magnet and sends a second signal to the processor and, when the processor receives the second signal from the magnetic sensor, the processor transitions the foldable electronic device into the operation state.

8. The foldable electronic device of claim 2, wherein:
the closure detector includes a contact lever and a push button separately disposed on the first cover unit and the second cover unit;
the contact lever contacts and engages the push button through an opening above the push button when the foldable electronic device closes with the first cover unit and the second cover unit being folded together; and
the push button senses presence of the contact lever and sends an encoded signal to the processor when a change is detected.

9. The foldable electronic device of claim 8, wherein,
when the foldable electronic device closes, the contact lever pushes down the push button and triggers the push button to send a third signal to the processor and, when the processor receives the third signal from the push button, the processor transitions the foldable electronic device into the standby state; and
when the foldable electronic device opens, the contact lever releases and disengages the push button and triggers the push button to send a fourth signal to the processor and, when the processor receives the fourth signal from the push button, the processor transitions the foldable electronic device into the operation state.

10. The foldable electronic device of claim 1, further including:
a display screen disposed on either the first cover unit or the second cover unit for display an image.

11. The foldable electronic device of claim 10, further including:
a transflective unit including a transflective plate and configured to reflect the image displayed on the display screen and to transmit a background real life scene to form an overlapped virtual image.

12. The foldable electronic device of claim 11, wherein:
the display screen is disposed on the second cover unit;
the transflective unit disposed on the first cover unit; and
when the foldable display device is in the open position, the first cover unit and the second cover unit are placed in a "∠" shaped position, such that the transflective plate and the display screen form an acute angle.

13. The foldable electronic device of claim 11, wherein:
the at least one pivotal connection structure includes at least a first pivotal connection structure and a second pivotal connection structure;
the transflective unit is pivotally connected to the first cover unit through the first pivotal connection structure; and
the transflective unit is pivotally connected to the second cover unit through the second pivotal connection structure.

14. The foldable electronic device of claim 13, wherein:
when the foldable display device is in the open position, the first cover unit, the transflective unit, and the first cover unit are placed in a Z shaped position, and the transflective plate and the display screen form an acute angle.

15. The foldable electronic device of claim 1, wherein:
the pivotal connection structure includes a first spring shaft and a second torsion spring shaft, each having a torsion spring.

* * * * *